(12) United States Patent
Whipple, Jr.

(10) Patent No.: US 12,411,981 B2
(45) Date of Patent: Sep. 9, 2025

(54) PERMISSIONS-BASED COMMUNICATION MANAGEMENT SYSTEMS AND METHODS

(71) Applicant: Christopher David Whipple, Jr., Cumberland, RI (US)

(72) Inventor: Christopher David Whipple, Jr., Cumberland, RI (US)

( * ) Notice: Subject to any disclaimer, the term of this patent is extended or adjusted under 35 U.S.C. 154(b) by 202 days.

(21) Appl. No.: 18/036,543

(22) PCT Filed: Nov. 11, 2021

(86) PCT No.: PCT/US2021/059019
§ 371 (c)(1),
(2) Date: May 11, 2023

(87) PCT Pub. No.: WO2022/103986
PCT Pub. Date: May 19, 2022

(65) Prior Publication Data
US 2023/0409740 A1 Dec. 21, 2023

Related U.S. Application Data

(60) Provisional application No. 63/112,273, filed on Nov. 11, 2020.

(51) Int. Cl.
*G06F 21/62* (2013.01)
*G06F 16/23* (2019.01)

(52) U.S. Cl.
CPC .......... *G06F 21/6245* (2013.01); *G06F 16/23* (2019.01)

(58) Field of Classification Search
CPC ....... G06F 21/6245; G06F 16/23; G09C 5/00; H04L 9/3226; H04W 12/08; H04W 12/06; H04W 12/02
See application file for complete search history.

(56) References Cited

U.S. PATENT DOCUMENTS

| | | | |
|---|---|---|---|
| 8,818,049 B2 * | 8/2014 | Wren | G06V 40/16 382/218 |
| 9,032,033 B2 | 5/2015 | Gronowski et al. | |
| 10,069,955 B2 * | 9/2018 | Gerace | H04W 4/023 |

(Continued)

OTHER PUBLICATIONS

International Search Report and Written Opinion dated Feb. 4, 2022 in International Application No. PCT/US2021/059019.

*Primary Examiner* — Baotran N To
(74) *Attorney, Agent, or Firm* — Wentsler LLC (57) ABSTRACT

A computer-implemented communication management system and method includes storing a data structure that is linked to a user account associated with a member and includes protected contact information specific to the member. A search of the data store is conducted to identify the member; and an approval request is transmitted over a communication network to be reviewed by the member. An approval submitted by the member is received, granting the Initiator permission to communicate with the member. The data structure is modified to store the permission of the Initiator to communicate with the member, and is used in response to an attempt by the Initiator to communicate with the member to permit a communication to be routed from the Initiator to the member using the protected contact information specific to the member, without revealing the protected contact information to the Initiator.

20 Claims, 6 Drawing Sheets

(56) References Cited

U.S. PATENT DOCUMENTS

| | | | |
|---|---|---|---|
| 10,574,805 B2 * | 2/2020 | Gerace | H04M 1/27475 |
| 2007/0208868 A1 | 9/2007 | Kidd et al. | |
| 2014/0025753 A1 | 1/2014 | Gronowski et al. | |
| 2020/0177721 A1 | 6/2020 | Gerace et al. | |

* cited by examiner

PERMISSIONS-BASED COMMUNICATION MANAGEMENT SYSTEMS AND METHODS

CROSS-REFERENCE TO RELATED APPLICATIONS

This is the National Stage under 35 U.S.C. § 371 of International Application No. PCT/US2021/059019, filed Nov. 11, 2021, which claims the benefit of U.S. Provisional Patent Application No. 63/112,273, filed Nov. 11, 2020, the entire content of which is incorporated herein by reference.

BACKGROUND OF THE INVENTION

1. Field of the Invention

This application relates generally to methods and apparatus for facilitating communications with approved entities and, more specifically, to methods and apparatus for controlling communications with a user while maintaining the privacy of personal contact information for that user.

2. Description of Related Art

Conventional communication systems rely on the public-accessibility and dissemination of an individual's personal contact information. For example, a publicly-listed telephone number for an individual can be used by telemarketers, fraudsters, and others with whom the individual does not wish to communicate. Once that individual's contact information has entered the public domain, the individual has lost the ability to restrict future use of that information, or control the future dissemination of that information to other third parties.

Conventional forms of contact information such as telephone numbers and email addresses, for example, also suffer from being static over time. Individuals often keep their contact information for long periods of time to ensure that their trusted contacts know how to reach them. However, the longer contact information remains unchanged, the more the contact information is disseminated and used for purposes other than as intended by the owner of that contact information. But if the individual changes the contact information the new contact information must be manually distributed to trusted contacts, a few of which are inevitably overlooked, making it difficult to reach the individual via the new contact information. Further, as soon as the individual uses the new contact information in a public setting, the cycle of losing control over one's contact information restarts.

More recently, developments in communication network technology have allowed businesses to reach their current and prospective customers in an efficient manner to convey special offers, updates concerning existing orders, information about service requests, etc. For example, a customer attempting to submit a request for coverage of a product under a warranty may be required to submit an email address and/or telephone number where they can be reached as a prerequisite to making the submission. Such contact information can be used by a service technician to schedule a service visit, or to answer a question the customer may have about the product.

However, the customer's contact information is often saved in the business's database, and subsequently used to send unsolicited advertisements to the customer, seek information from the customer in the form of a survey, or otherwise establish contact with the customer. Additionally, the business can sell its customer list with contact information to other entities, generating additional revenue. Although customers can be given the opportunity to unsubscribe or otherwise opt out from future communications from the business, such attempts to stop undesired communications may not be honored by all entities that have access to the contact information. Further, the customer's contact information can be disseminated to additional entities faster than the customer can unsubscribe from unwanted emails, telemarketing calls, etc., causing the customer to lose control of his/her own contact information.

BRIEF SUMMARY OF THE INVENTION

Accordingly, there is a need in the art for a system, apparatus and method of protecting contact information within a communication network. For example, actual contact information for an entity can be obfuscated from parties attempting to reach the entity via a communication network. Instead, the entity can optionally be searchable, or otherwise locatable within a data structure stored in a non-transitory, computer readable medium accessible via the communication network. A request to connect with the entity can be submitted by a party that desires to initiate a communication with the entity, and the request submitted to the entity for approval. Until the entity approves the request, a specially-programmed computing system can interfere with, and optionally prevent completion of the communication with the entity.

A confidential nature of the entity's actual contact information can optionally be maintained even after the entity approves of the other party's request to communicate with the entity. For example, the present technology can optionally store approval of the party's request to communicate with the entity, allowing the party to initiate future communications with the entity by logging into the communication network, or by otherwise commencing communications through the communication network. According to alternate embodiments, fictitious or "virtual" contact information can be returned to the party, or otherwise used by the programmed computing system in response the entity's approval of the communication request to establish future communications with the entity. For example, future attempts by the party to communicate with the entity based on the record stored in the data structure, and/or using the virtual contact information, after the entity's approval of the communication request, can be routed by the computing system to the entity using the entity's actual contact information. Accordingly, the party can communicate with the entity, and the entity's actual contact information can remain unknown to the party.

According to one aspect, the subject application involves a permissions-based communication management system. The system includes a processor; a data store that stores a data structure that is linked to a user account associated with a member, the data structure comprising protected contact information specific to the member; and a memory coupled to the processor. The memory stores a permissions module comprising instructions that, when executed by the processor in response to receiving a request to communicate with the member submitted by an Initiator, cause the processor to: (i) conduct a search of the data store to identify the member; (ii) in response to identifying the member, transmit an approval request over a communication network to be reviewed by the member; (iii) receive an approval submitted by the member granting the Initiator permission to communicate with the member; and (iv) modify the data structure to store the permission of the Initiator to communicate with the member. A routing module is provided to the system, and includes instructions that, when executed by the processor, cause the processor to: (i) determine that the permission of the Initiator to communicate with the member is stored by the data structure in response to an attempt by the Initiator to communicate with the member, and (ii) route a communication from the Initiator to the member using the protected contact information specific to the member stored by the data structure, without revealing the protected contact information to the Initiator.

According to another aspect, the subject application involves a computer-implemented, permissions-based method of managing network communications. The method includes storing, in a non-transitory memory, a data structure that is linked to a user account associated with a member, the data structure comprising protected contact information specific to the member. In response to receiving a request to communicate with the member submitted by an Initiator: (i) a search of the data store is conducted to identify the member; (ii) an approval request is transmitted over a communication network to be reviewed by the member; (iii) an approval is submitted by the member granting the Initiator permission to communicate with the member; and (iv) the data structure is modified to store the permission of the Initiator to communicate with the member. The permission of the Initiator to communicate with the member is stored by the data structure is determined in response to an attempt by the Initiator to communicate with the member. A communication is routed from the Initiator to the member using the protected contact information specific to the member stored by the data structure, without revealing the protected contact information to the Initiator.

According to another aspect, the subject application involves a non-transitory computer-readable medium storing instructions that when executed by one or more processors cause the one or more processors to perform at least a method. For example, the method can include storing, in a non-transitory memory, a data structure that is linked to a user account associated with a member, the data structure comprising protected contact information specific to the member. In response to receiving a request to communicate with the member submitted by an Initiator: (i) a search of the data store is conducted to identify the member; (ii) an approval request is transmitted over a communication network to be reviewed by the member; (iii) an approval submitted by the member is received, granting the Initiator permission to communicate with the member; and (iv) the data structure is modified to store the permission of the Initiator to communicate with the member. It is determined that the permission of the Initiator to communicate with the member is stored by the data structure in response to an attempt by the Initiator to communicate with the member. A communication is routed from the Initiator to the member using the protected contact information specific to the member stored by the data structure, without revealing the protected contact information to the Initiator.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

There is a need in the art for apparatus and methods for protecting an entity's contact information while facilitating authorized forms of communication between the entity and other parties. There is also a need in the art apparatus and methods to centrally maintain contact information, and maintain communications between members and third parties who are authorized to communication with the members, even if the members' personal contact information has changed.

The present disclosure is directed toward enabling network members to communicate with third parties (including private citizens, consumers, organizations, corporations, businesses, and the like) while obfuscating the personal contact information of those network members. According to some embodiments, a network member can modify a data structure to reflect the granting or revocation of a permission (at any time) to receive communications from a third party, optionally specifying the forms of permissible communications. Allowing network members to set permissions on a per-user, per-communication type, basis, the network members are able to better identify, and possibly eliminate spam, phishing attempts, and robocalls.

Further, the present apparatus and methods can centralize the personal contact information of network members, allowing that information to be updated within the system to allow third parties authorized to communicate with the respective network member to reach the network member via the updated contact information. This is true even if the third party does not know the updated contact information. For example, if the network member's cell phone number changes, the new number can be updated in the system which, in turn, modifies the data structure to reflect the new number. A call from anyone who the network member has previously granted permission to call the network member on the cell phone, is automatically forwarded to the new number by the system. Forwarding of such a call to the updated number occurs invisibly to the caller, without the caller knowing the new number due to the obfuscation of the new number. Obfuscation of the network member's personal contact information can apply to one or more of their actual: physical address(es), email address(es), phone number(s), a direct messaging identity, a web-based networking or communication system identity, and any other information stored in the data structure generated and modified by the system.

Figure 1:
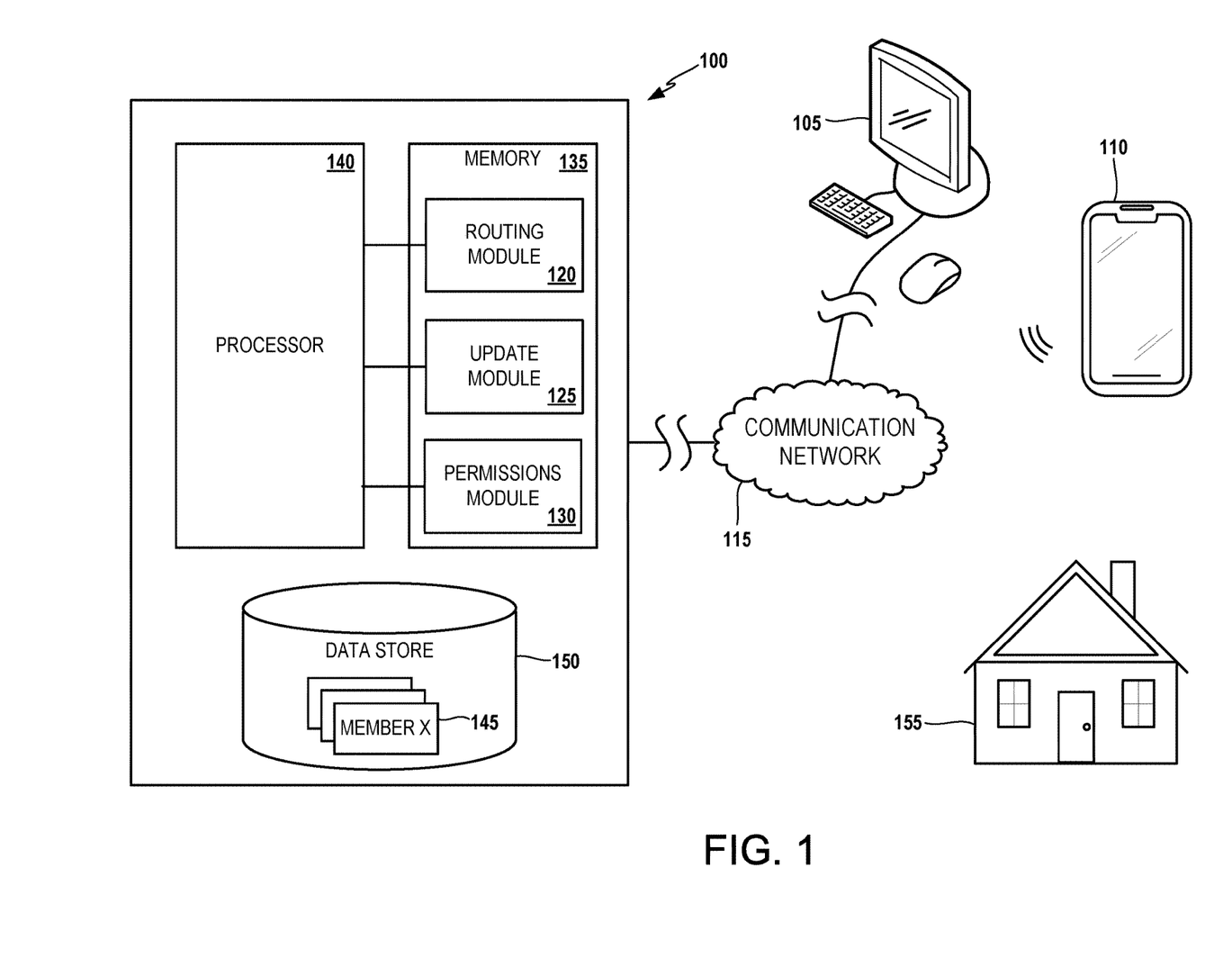
FIG. 1 shows an illustrative embodiment of a permissions-based system for controlling communications, and limiting communications to authorized Initiators.

With reference to the drawings, FIG. 1 illustrates an exemplary embodiment of a permissions-based communication management system 100. The system 100 is schematically illustrated as a block diagram, which can be implemented utilizing one or more computing devices, such as computing device 600, shown and described below with respect to FIG. 6. According to some embodiments, the system 100 can include an application or collection of distributed applications. The applications and system 100 may be configured to operate with, or be implemented as a cloud-based networking system, a software as a service (SaaS) architecture, a node in a cluster computing system or another type of networked computing solution. For example, the system 100 is illustrated in FIG. 1 as a centralized server-side application that performs at least the computerized functions disclosed herein and that electronically communicates with a plurality of nodes such as a computer terminal 105, a cellular telephone 110, or any other electronic device that can communicate electronically over a communication network 115, for example.

One or more of the components of the system 100 can be embodied as program modules (e.g., routing module 120, update module 125, permissions module 130) stored in a memory 135 of the system 100. The program modules are configured with instructions that, when executed by at least a processor 140, cause the computing system 100 to perform the corresponding function(s).

One or more data structures 145 containing contact information specific to network members are stored in a data store 150, which can include a database stored in a non-transitory computer-readable medium. Examples of the data store 150 include, but are not limited to a flash memory, hard-disk drive or similar non-volatile computer-storage media. Accordingly, the processor 140 accesses the data store 150 and/or the memory 135 to store various data when performing the disclosed functions. As shown in FIG. 1, the data store 150 is integrated with the computing system 100. However, in other embodiments, the data store 150 can be implemented as a distributed storage that stores the data structures 145 among a distributed network of storage devices.

In some embodiments, the data structures 145 for a network member store contact information specific to that member including at least one of a: work email address, personal email address, personal telephone number, work telephone number, mobile telephone number, fax number, profile name within a social network, and mailing address of a home 155 where the member resides. The content of the data structures 145 is associated with a user account, and editable by the member that owns the user account. According to some embodiments, the data structures 145 can optionally be updated to include information added by a third party. For example, third parties can optionally be granted limited permissions to add or upload such third-party information to be included in the data structures 145 associated with network members. However, the limited permissions can optionally exclude the right to delete or edit information included in the data structures 145. According to some embodiments, however, third parties can optionally be permitted to edit information that those respective third parties added to the data structures 145. Thus, if a third party were to add medical record information, school grades, credit information, etc. to a data structure 145 and later discovered an error, or the previously-added third-party information had changed, the same third party that added the information to the data structure 145 could optionally be granted edit rights to later change the previously-added information. The present system can optionally include data tracking or another record tracking feature that creates an audit trail allowing the network member associated with the respective data record 145 to identify when additions to the data record 145 were made, when edits to such information were made, and/or the party responsible for the addition and/or changes of such information.

The term "member" is used herein to refer to a person who has created a user account for the system 100, and has stored contact information in a data structure 145 assigned to that person. To create the user account, the member can access the system 100 remotely, by utilizing a computing device such as the terminal 105, for example, and enter their contact information. The system 100 can optionally validate the contact information, such as by transmitting a system-generated text, email, phone call, etc. over the communication network 115, requiring manual confirmation by the member before the user account becomes active.

Before a communication can be initiated by a third party to the member through the system 100, both the third party and the form of communication to be used by the third party are required to be approved by the member, and the approval stored in the data structure 145 associated with the member. The process of obtaining such approvals can vary depending on the form of communication used.

Figure 2:
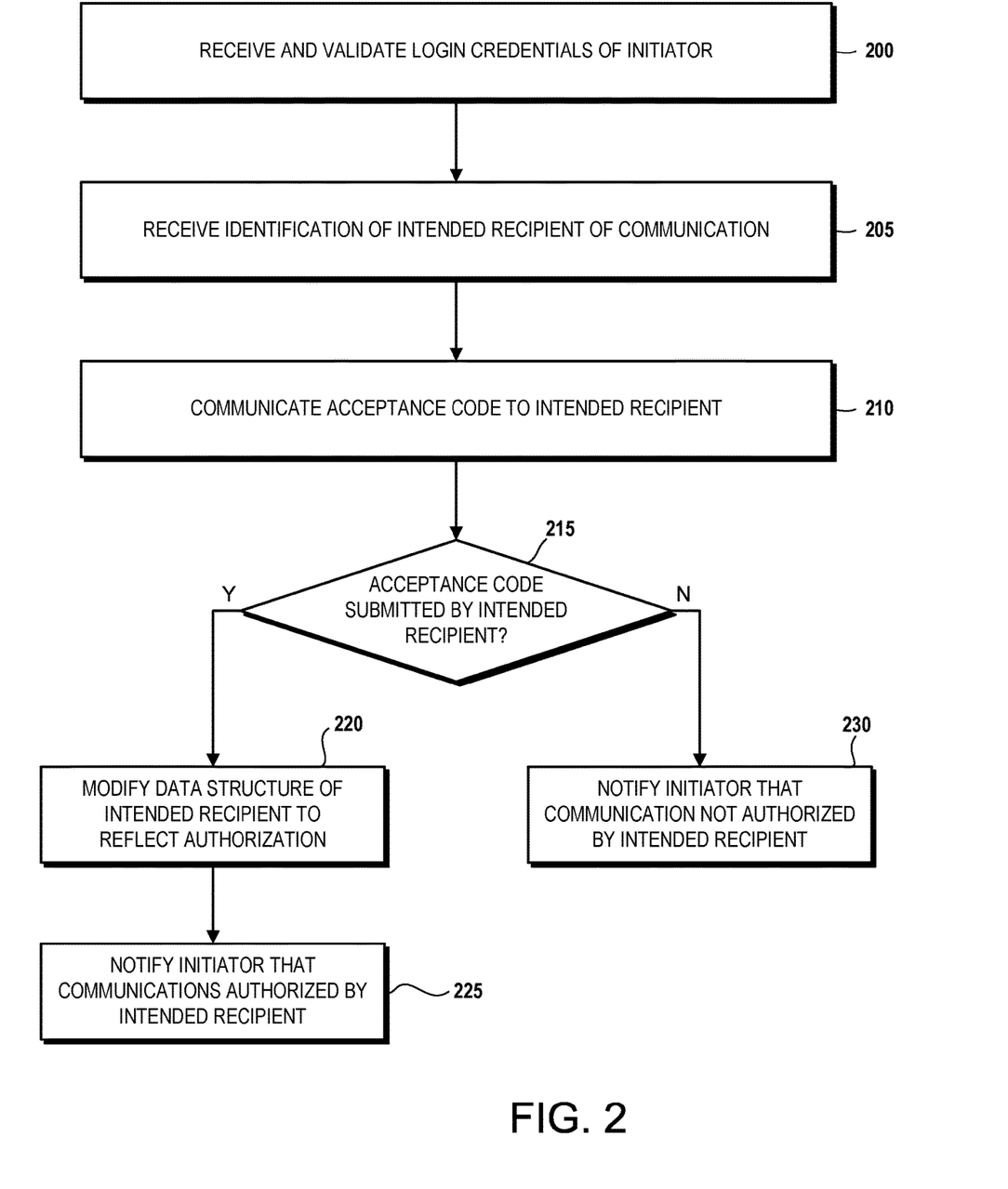
FIG. 2 is a flow diagram schematically illustrating an embodiment of a process of remotely requesting authorization to communicate with an intended recipient.

According to some embodiments, a member initiating the process of obtaining approval to contact another member through the system 100 (hereinafter referred to as the "Initiator") can request approval to contact the intended recipient of the communication remotely, such as by using the computer terminal 105 for example. As depicted in FIG. 2, the Initiator logs into the system 100 by submitting credentials such as a username and password combination, or any other information that can uniquely identify the Initiator to the system 100, at block 200. If the received credentials match, the Initiator is granted access to the system 100, otherwise such access is denied.

At block 205, the Initiator submits information identifying the intended recipient with whom the Initiator wishes to communicate, which is transmitted over the communication network 115, and received by the permissions module 130. Based on the received identity information, the permissions module 130 conducts a search of content in the data store 150 or other database to attempt to identify the intended recipient. If a match is found, an acceptance code, password, link to a website or other network location, or any other information that can be used by the intended recipient to approve of a contact is transmitted by the permissions module 130 over the communication network 110 to a terminal associated with the intended recipient, at block 210. For example, the acceptance code can be transmitted to the cellular telephone 110 that the intended recipient used to log into the system 100. If, at block 215, it is determined that the intended recipient has submitted the acceptance code back to the permissions module 130 when logged into the system 100, then the permissions module 130 modifies the data structure 145 associated with the intended recipient, at block 220. The data structure 145 is modified to reflect that: (i) the intended recipient has authorized the Initiator to communicate with the intended recipient through the system 100, and (ii) the approved method(s) of communication (e.g., phone, email, etc.). At block 225, the system 100 notifies the Initiator that the intended recipient has authorized communications from the Initiator through the system 100, and optionally identifies the method(s) of communications authorized. These permissions can be changed at any time.

If, however, the permissions module 130 determines at block 215 that the intended recipient does not submit the acceptance code, or denies authorization for communications from the Initiator, then the permissions module 130 notifies the Initiator, at block 230, that communications with the intended recipient through the system 100 are not authorized. When communications are not authorized, the system 100 blocks attempts to reach the intended recipient through the system 100.

Figure 3:
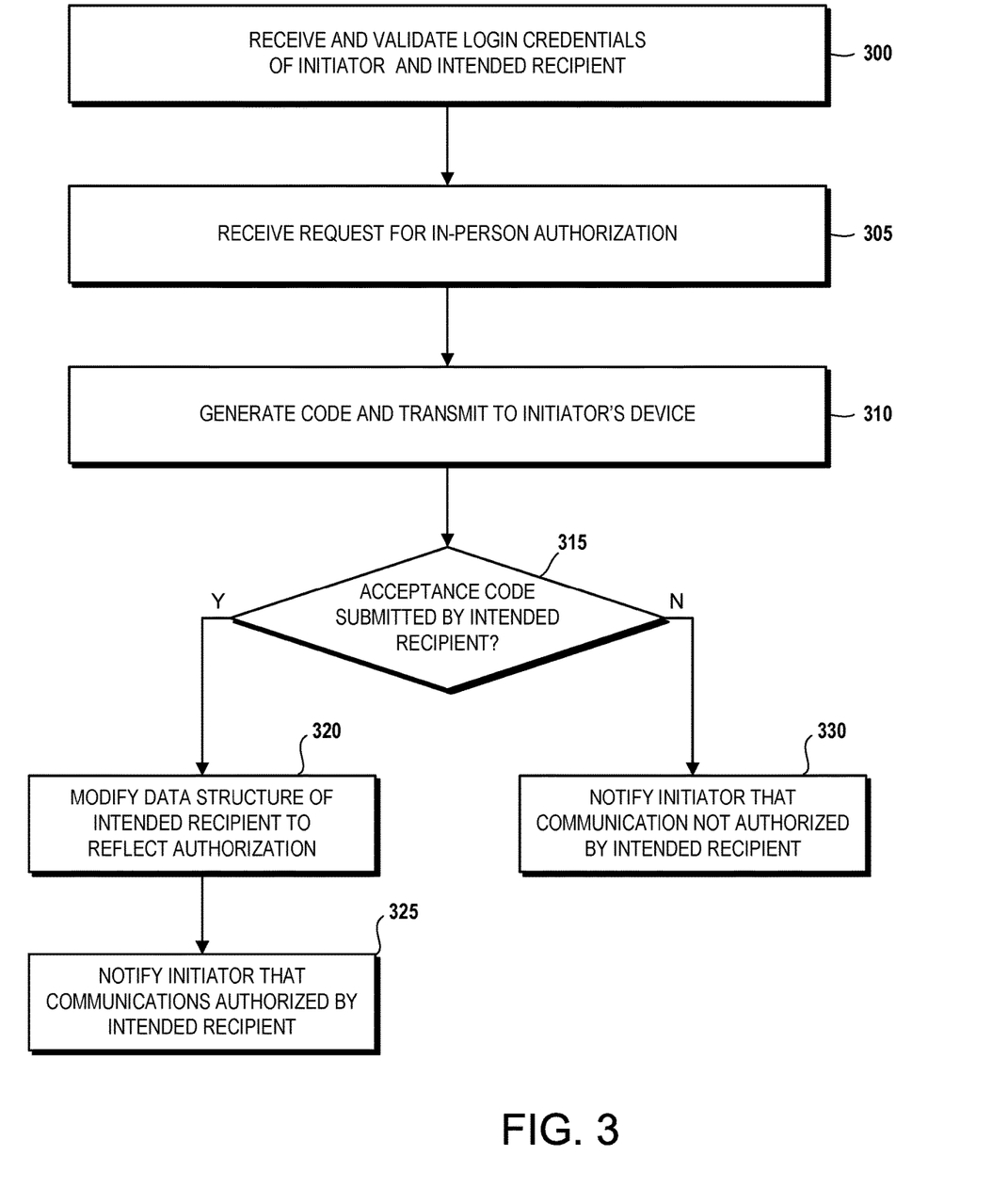
FIG. 3 is a flow diagram schematically illustrating an embodiment of a process of requesting authorization to communicate with an intended recipient, in person.

According to other embodiments, the Initiator can request approval to contact the intended recipient of the communication while physically present at a location with the intended recipient. As depicted in FIG. 3, the Initiator and intended recipient both log into the system 100 by submitting login credentials or information that uniquely identify the Initiator and the intended recipient to the system 100, at block 300. If the received credentials match, the Initiator and intended recipient are granted access to the system 100.

At block 305, the Initiator submits a request for in-person authorization over the communication network 115, which is received by the permissions module 130. In response, the permissions module 130 generates a computer-readable authorization code (e.g., QR code, barcode, etc.) and transmits the code to the Initiator's terminal (e.g, computer terminal 105) at block 310. The intended recipient can submit acceptance of the authorization code, indicating the intended recipient's grant of authorization of communications from the Initiator through the system 100, by using a camera provided to the intended recipients cellular phone 110, for example. If such acceptance is determined by the permissions module 130 to be received at block 315, then the permissions module 130 modifies the data structure 145 associated with the intended recipient, at block 320. The data structure 145 is modified to reflect that: (i) the intended recipient has authorized the Initiator to communicate with the intended recipient through the system 100, and (ii) the approved method(s) of communication (e.g., phone, email, etc.). At block 325, the system 100 notifies the Initiator that the intended recipient has authorized communications from the Initiator through the system 100, and optionally identifies the method(s) of communications authorized.

If, however, the permissions module 130 determines at block 315 that the intended recipient does not submit the acceptance code, or denies authorization for communications from the Initiator, then the permissions module 130 notifies the Initiator, at block 230, that communications with the intended recipient through the system 100 are not authorized. When communications are not authorized, the system 100 blocks attempts by the Initiator to reach the intended recipient through the system 100.

Figure 4:
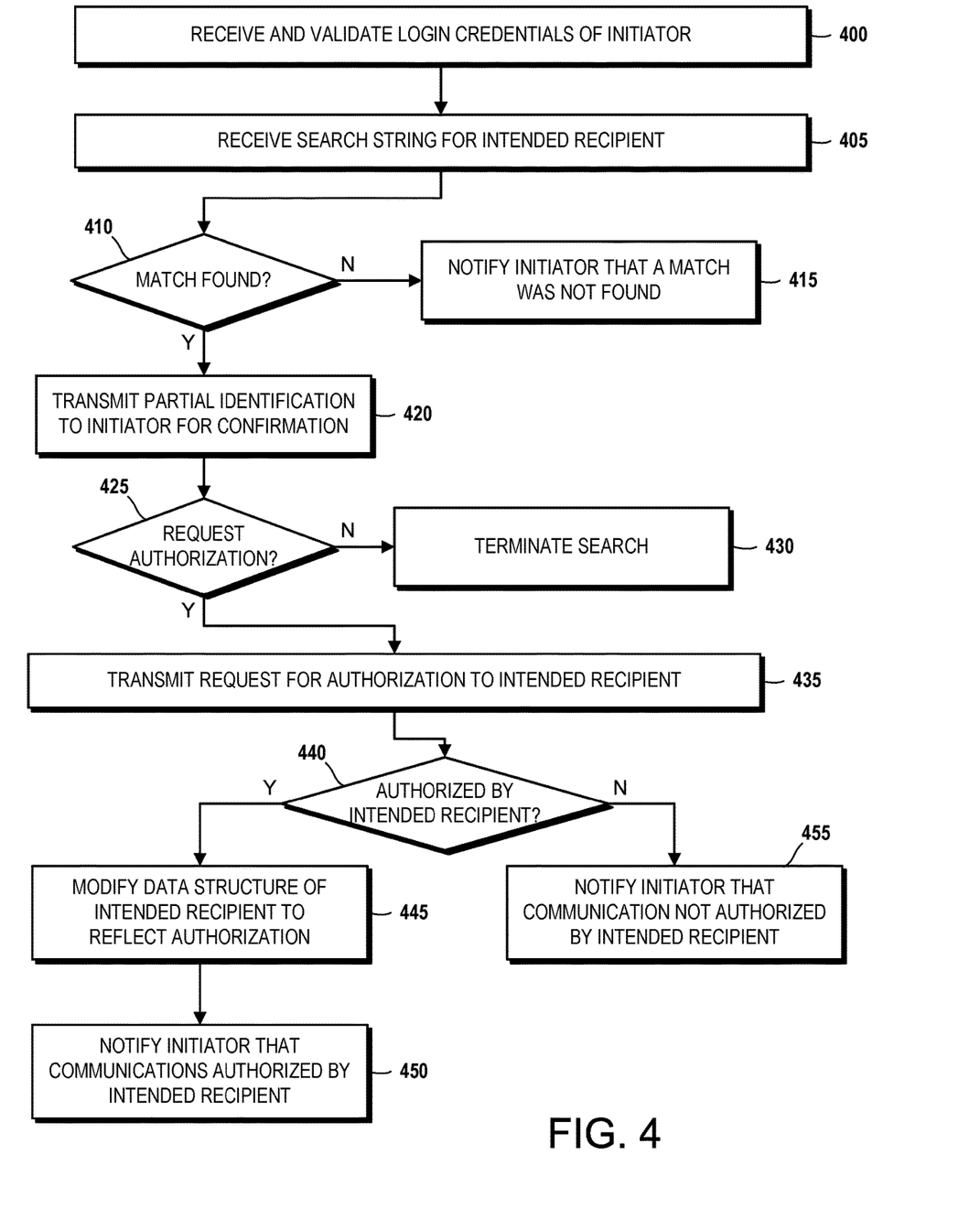
FIG. 4 is a flow diagram schematically illustrating an embodiment of a process of requesting authorization to communicate with an intended recipient.

According to some embodiments, the identification of the intended recipient may not be fully known to the Initiator, causing the Initiator to conduct a search for the intended recipient through the system 100. As shown in FIG. 4, the Initiator logs into the system 100 by submitting credentials or other information that can uniquely identify the Initiator to the system 100, at block 400. If the received credentials match, the Initiator is granted access to the system 100, otherwise such access is denied.

At block 405, a search string submitted by the Initiator is received by the permissions module 130. If, at block 410, the permissions module 130 determines that a match could not be found, the process ends and the Initiator is notified at block 415. If, however, the permissions module 130 determines a result matching the search string could be found at block 410, partial identification of the intended recipient can be transmitted by the permissions module 130 over the communication network 115 to the Initiator's terminal at block 420. For example, a first name of the result returned by the search can be presented to the Initiator, allowing the Initiator to make a decision whether the search result is likely the actual member being sought.

If the permissions module 130 determines, at block 425, that the Initiator submitted a desire to abandon the search, the search is terminated at block 430. If, however, the permissions module 130 determines at block 425 that the Initiator believes the partial identification matches the member being sought, the permissions module 130 transmits the authorization request to the intended recipient at block 435.

If, at block 440, it is determined that the intended recipient has submitted an indication that communications from the Initiator are authorized, then the permissions module 130 modifies the data structure 145 associated with the intended recipient at block 445. The data structure 145 is modified to reflect that: (i) the intended recipient has authorized the Initiator to communicate with the intended recipient through the system 100, and (ii) the approved method(s) of communication (e.g., phone, email, etc.). At block 450, the system 100 notifies the Initiator that the intended recipient has authorized communications from the Initiator through the system 100, and optionally identifies the method(s) of communications authorized.

If, however, the permissions module 130 determines at block 440 that the intended recipient had denied authorization for communications from the Initiator, then the permissions module 130 notifies the Initiator, at block 455, that communications with the intended recipient through the system 100 are not authorized.

According to alternate embodiments, the Initiator can optionally be associated with a user account in the system 100, and seek to establish communications with an intended recipient that is external to the system 100. In other words, the intended recipient can have publicly-available, or unprotected contact information (e.g., a known commercial email address, such as a customer service email address) associated with an entity (e.g., customer service, technical support, etc.) or an individual (e.g., a a personal, web-based email address such as Yahoo Mail, Gmail). The Initiator may wish to contact the external intended recipient, but not want to disclose the Initiator's own protected contact information (e.g., the Initiator's own email address, username, etc.). Instead, the Initiator can log into the present system 100 to establish such communications, exposing only intermediary contact information to the external recipient. The intermediary contact information provides the external recipient with contact information to which email replies or other communications can be sent by the external recipient to the Initiator, for so long as the Initiator desires to receive such responsive communications. When the Initiator no longer wishes to receive further communications from the external recipient via that mode of communication, the Initiator can deactivate the intermediary contact information, change, delete or otherwise interrupt communications from the external recipient to the Initiator via the intermediary contact information.

For example, the intermediary contact information can include a virtual email address that is generated by the system 100, to be presented to the external recipient as the Initiator's own email address where responsive emails can be sent to the Initiator. According to alternate embodiments, the system 100 can present a virtual username when establishing FaceTime or other video communications with the external recipient. For each example, the "virtual" contact information is the information to which responsive communications can be sent to reach the Initiator, but is not the Initiator's actual contact information. Thus, the Initiator's actual email address or other contact information is protected from the external recipient. In the event that the Initiator no longer wishes to receive email communications from the external recipient, for example, the virtual email address can be deactivated within the Initiator's user account in the system 100. Also, the Initiator can update the Initiator's user account to associate virtual contact information with a new, actual email address of the Initiator, for example. Thus, when the Initiator receives a new email address or other actual contact information, updating information in the Initiator's user account to associate the new actual contact information with any virtual contact information will result in future communications transmitted to the virtual contact information (e.g., the virtual email address) to be transmitted to the Initiator's new actual contact information. Accordingly, the Initiator does not necessarily have to lose contacts with external recipients as a result of changing actual contact information.

Figure 5:
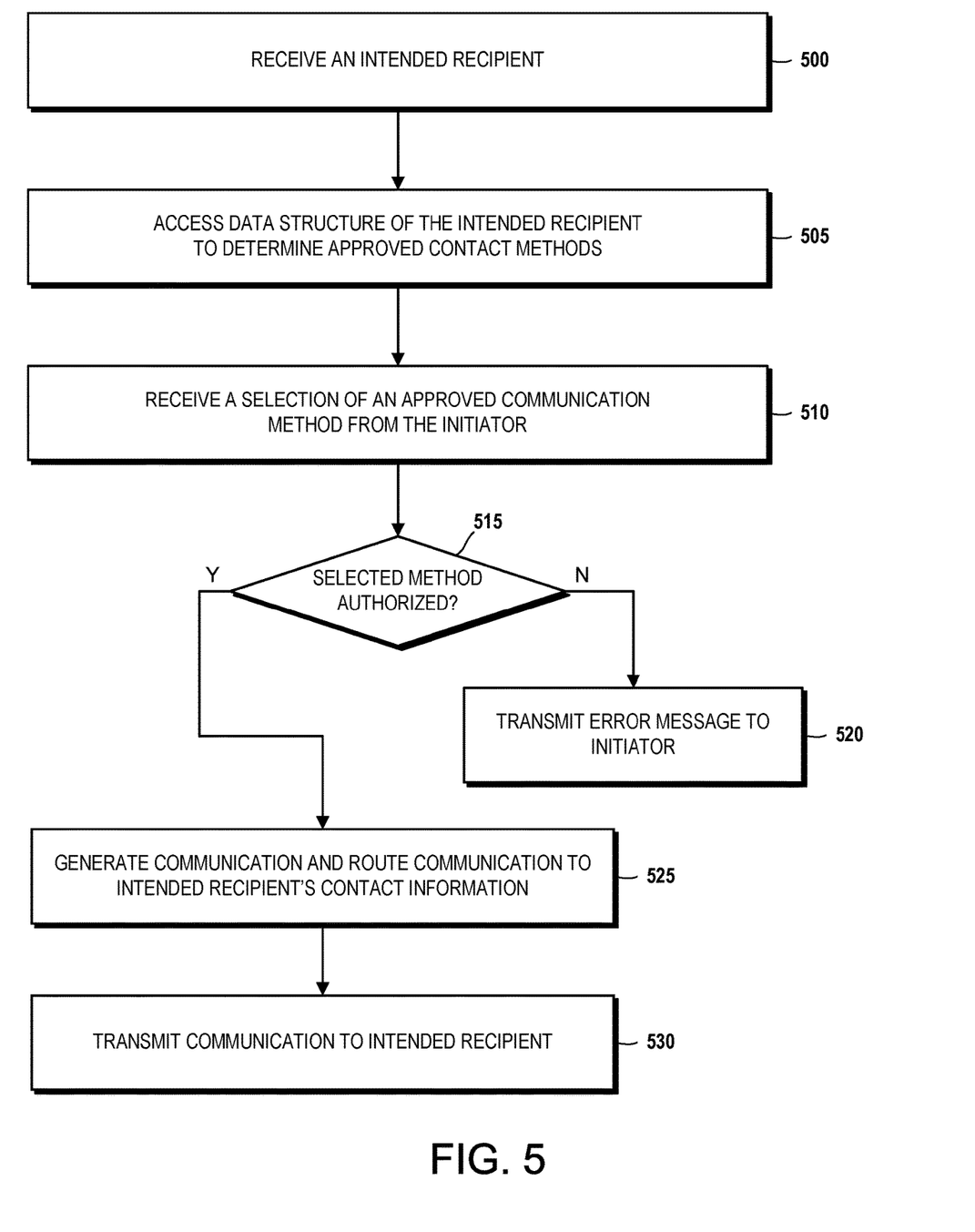
FIG. 5 is a flow diagram schematically illustrating an embodiment of a process of initiating a communication to an intended recipient.

Once communications from an Initiator are authorized by an intended recipient in the system 100, or to an external recipient, the Initiator can attempt to communicate with the intended recipient by logging into the system 100. At block 500, the routing module 120 receives the intended recipient identified by the Initiator as the person to whom the communication is to be sent. The intended recipient can optionally be selected from a contact list stored for the Initiator in the data store 150.

In response to selection of the intended recipient, the routing module 120 can access the data structure 145 for the intended recipient at block 505, to determine the approved forms of communication (e.g., email, cell phone, etc.). The Initiator is presented with approved communication methods as options from which the Initiator can choose the desired method. A desired mode of communication is received at block 510, and the routing module 120 confirms whether the selected mode is authorized at block 515. If the routing module 120 determines the selected mode is not authorized at block 515, an error message is returned to the Initiator at block 520, and the communication attempt ends.

If, however, the selected mode of communication is determined to be authorized at block 515, the communication is generated based on content input to the system 100 by the Initiator at block 525. For example, the Initiator can type text to be sent to the intended recipient via an email. The computer terminal 105 used by the Initiator, for example, can open a new email window addressed to the intended recipient selected via the system 100, in the Initiator's email client of choice (e.g., gmail, Outlook, etc.) or potentially an email client within system. In response to receipt of a "Send" command input by the Initiator, the routing module 120 receives the content typed by the Initiator, and looks up the actual email address of the intended recipient from the data structure 145 associated with the intended recipient. The routing module 120 creates a new email, copies over all of the contents of the original email sent to the system 100 by the Initiator, and transmits the new email to the intended recipient at block 530. Thus, the Initiator sends the email to the intended recipient without knowing the intended recipient's actual email address, which may be personal and private to the intended recipient. Likewise, the Initiator's email address is obfuscated from the intended recipient. This also works as a form of verification that this email was generated and sent by the Initiator, as it was verified by the system 100, which helps to protect users from phishing and spam attempts.

As another example, the Initiator may wish to physically mail a letter, or ship a parcel to the house 155 where the intended recipient lives, or other delivery location. The process is the same as it was described above through the receipt of the selection of an approved communication method. Instead of the selection of an email, however, the routing module 120 receives an Initiator selection of "parcel post" or "USPS" for example, at block 510. Again, the routing module 120 confirms that the selected mode of communication is authorized at block 515.

Generation and routing of the communication at block 525, however, involves generating label content to be applied to the parcel or letter to be delivered to the house 155. The label content generated includes information that can inform the USPS, FedEx, UPS, or other carrier of the delivery destination, but does not include the actual mailing address of the house 155. For example, the label content can include a human-readable routing number (e.g., numerals, alphabetic characters, alpha-numeric characters, etc.), a barcode or any other computer readable code, or any other content that can be used to look up the actual mailing address of the house 155, but does not inform the Initiator of the actual mailing address of the house 155.

The label content can be generated on demand, and change for each mailing. Further, the authorization of communications granted by the intended recipient to the Initiator can expire. For example, a one-time authorization can allow generation of label content for a single mailing, yet prevent subsequent mailings using the same label content. According to other embodiments, authorization can be set to expire after a defined period of time elapses. For example, an Initiator can be permitted to initiate communications such as mailings during a holiday season, but not during other times of year. Accordingly, even if the Initiator is a retailer that regularly mails advertisements, the Initiator can mail a parcel or letter, send email confirmations or communications using the present system 100, but will be unable to subsequently communicate once authorization expires. Expiring permissions can also apply to other forms of communication, including emails and calls.

For example, a service department of a retailer may be granted permission to call an intended recipient for a defined period of time (e.g., two weeks) as part of a warranty claim resolution process. To initiate a communication such as a telephone call to the intended recipient, a service representative in the service department can log in or otherwise access the system 100. If permission to contact the intended recipient has not yet been granted, the service department can request such approval as described elsewhere herein. If contact permission has been granted, the service representative can select the name of the intended recipient from a menu, search result field, etc. accessible within a web browser application (e.g., Mozilla Firefox, Microsoft Edge, etc.), a system-specific application locally executed by a terminal operated by the service representative, or other application. At the time when the intended recipient is selected, the routing module 120 can access the data structure 145 of the intended recipient, and link a temporary telephone number of the system 100 to the intended recipient's actual telephone number in the data structure 145. The temporary telephone number is transmitted to the service representative's terminal, allowing the service representative to manually call that temporary telephone number to reach the intended recipient, or initiate a dialing routine of that number by a voice-over-Internet telephone through the terminal. However, because the temporary telephone phone number is not the intended recipient's actual telephone number, the intended recipient's actual telephone number remains concealed from the service department. Instead, calls to the temporary telephone number assigned to the intended recipient by the routing module 120 are routed through the system 100 which, in turn, forwards or otherwise directs the call to the intended recipient's actual telephone number during the defined period of time when the service department is approved to contact the intended recipient. When the defined period of time expires, the permission allowing the service department to call the intended recipient is rescinded, causing the system 100 to intercept further attempts by the service department to call the intended recipient through the present system 100.

According to some embodiments, communications between parties via the system 100 can be secured using enhanced security measures such as two factor authentication. For example, the Initiator can attempt to send an email to an intended recipient through the system 100. According to such an example, the Initiator can compose a new email using any email client with a plugin or other compatibility with the present system 100. Upon opening a new email, a plugin of the present system 100 integrated with or external to the email client can transmit a notice to the system 100, indicating that the Initiator is attempting to send an email. Accordingly, the routing module 120 or other component can generate a record indicating that an email from the Initiator is expected. Since the Initiator's actual email address is stored in the Initiator's user account in the system 100, when the Initiator issues the "Send" command to transmit the email from the email client, the routing module 120 can verify that the email originated from the Initiator's actual email address before forwarding the content of the email to the intended recipient using a virtual email address. Accordingly, the system 100 can confirm the identity of the Initiator when transmitting communications, to further protect against possibly nefarious or nuisance email communications. Similar arrangements can be used to verify the identity of the Initiator when placing a telephone call through the system 100. The Initiator's actual phone number can be verified in advance of issuing the call to the intended recipient.

Because the temporary telephone number is linked to the intended recipient's actual telephone number on demand, when a call is to be established with the intended recipient, that temporary telephone number can be "recycled" once the call has been established, during the call, or after the call is completed. For example, the temporary telephone number can be linked by the routing module 120 to an actual telephone number of a different intended recipient at a time when a caller with permission seeks to establish a telephone call with the different intended recipient. Thus, a unique telephone number is not required to be used to obfuscate the telephone number of each intended recipient, instead leveraging a pool of available temporary telephone numbers that can be repeatedly linked to different intended recipients to establish approved telephone calls.

In some embodiments, members can update the information in their data structure 145, to accommodate changes to telephone numbers, new addresses following a move (or even a change of location such as traveling to a vacation residence). For example, if a member obtains a new email address, the new email address can be transmitted to the update module 125. In response to receiving a change of information, the update module 125 modifies the data structure 145 for the respective member, so emails, phone calls, mailings, and other authorized modes of communication are routed by the routing module 120 to the up-to-date contact information.

The present system 100 adds obfuscation and permissions to unsecure forms of communication, and also allows users to revoke permission at any time, as if they had deleted their number out of someone else's phone, which is an improvement over services like blocking numbers, which are only one sided and does not prevent them from calling from other numbers or selling or otherwise disseminating the information to other parties.

The system 100 can reduce the total number of servers that this information lives on, reducing the risk of being compromised as a result of a breech. As for companies, the customer information is kept up to date by their customers and is stored offsite on company servers.

The system 100 covers PSTN Phone Calls (adding permission to external infrastructure), emails (adding permission to external infrastructure) and direct messaging (internal infrastructure). Other embodiments include obfuscation of physical addresses (there will be 2 permissions levels: one will be for sending mail and packages which will still obfuscate the address, and a second level of permission that actually reveals the address without obfuscation), video calling, group messaging, and other personal information including but not limited to: social security numbers, medical records, prescription information, bank accounts, credit cards, employer information, tax information and really any other personal information that may be shared over the internet that needs to be protected.

Figure 6:
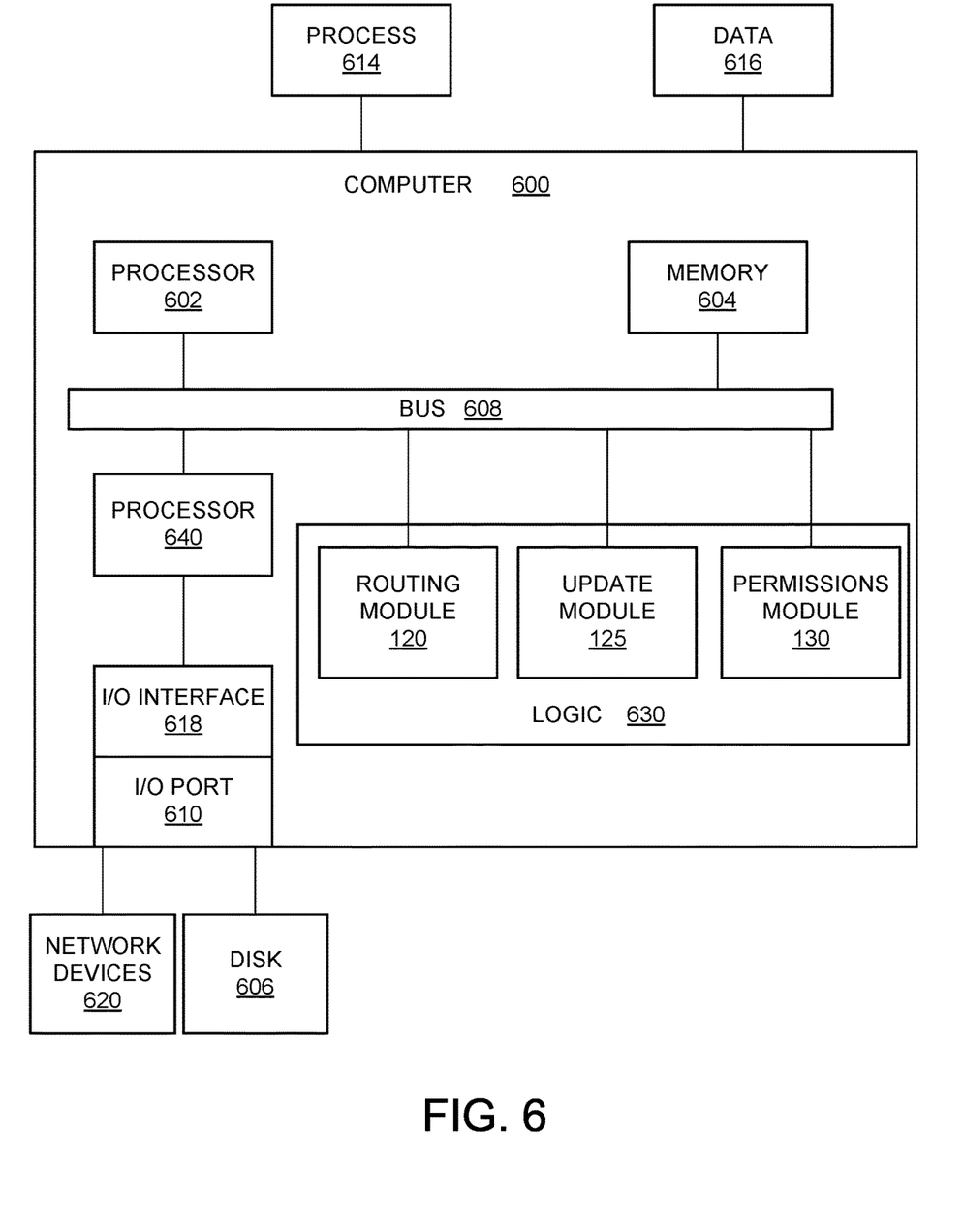
FIG. 6 illustrates an embodiment of a computing system configured with the systems and/or processes disclosed herein.

FIG. 6 illustrates an example of a computing device that is configured and/or programmed with one or more of the example systems and methods described herein, and/or equivalents. The example computing device may be a computer 600 that includes a processor 602, a memory 604, and input/output ports 610 operably connected by a bus 608. In one example, the computer 600 may include logic 630 configured to control communications with respect to the system 100 shown in FIG. 1. In different examples, the logic 630 may be implemented in hardware, a non-transitory computer-readable medium with stored instructions, firmware, and/or combinations thereof. While the logic 630 is illustrated as a hardware component attached to the bus 608, it is to be appreciated that in other embodiments, the logic 630 could be implemented in the processor 602, stored in memory 604, or stored in disk 606.

In one embodiment, logic 630 or the computer 600 is a means (e.g., structure: hardware, non-transitory computer-readable medium, firmware) for performing the actions described. In some embodiments, the computer 600 may be a server operating in a cloud computing system, a server configured in a Software as a Service (SaaS) architecture, a smartphone, laptop, tablet computing device, and so on.

The means may be implemented, for example, as an ASIC programmed to authorize communications between members, and limit communications to authorized members. The means may also be implemented as stored computer executable instructions that are presented to computer 600 as data 616 that are temporarily stored in memory 604 and then executed by processor 602.

Logic 630 may also provide means (e.g., hardware, non-transitory computer-readable medium that stores executable instructions, firmware) for performing the operations regarding facilitating authorized communications as described herein.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output (I/O) interface (e.g., card, device) 618 and an input/output port 610. The disk 606 may be, for example, a magnetic disk drive, a solid-state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD-ROM, and so on. The memory 604 can store a process 614 and/or a data 616, for example. The disk 606 and/or the memory 604 can store an operating system that controls and allocates resources of the computer 600.

The computer 600 may interact with input/output (I/O) devices via the I/O interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the I/O interfaces 618, and/or the I/O ports 610. Through the network devices 620, the computer 600 may interact with a network. Through the network, the computer 600 may be logically connected to remote computers. Networks with which the computer 600 may interact include, but are not limited to, a LAN, a WAN, and other networks.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium," as used herein, refers to a non-transitory medium that stores instructions and/or data configured to perform one or more of the disclosed functions when executed by at least a processor. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read-only memory (ROM), a memory chip or card, a memory stick, solid-state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions.

"Logic," as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described.

To the extent that the term "includes" or "including" is employed in the detailed description or the claims, it is intended to be inclusive in a manner similar to the term "comprising" as that term is interpreted when employed as a transitional word in a claim.

What is claimed is:

1. A permissions-based communication management system comprising:
    a processor;
    a data store that stores a data structure that is linked to a user account associated with a member, the data structure comprising protected contact information specific to the member; and
    a memory coupled to the processor storing:
        a permissions module comprising instructions that, when executed by the processor in response to receiving a request to communicate with the member submitted by an Initiator, cause the processor to: (i) conduct a search of the data store to identify the member; (ii) in response to identifying the member, transmit an approval request over a communication network to be reviewed by the member; (iii) receive an approval submitted by the member granting permission to the Initiator to communicate with the member; and (iv) modify the data structure to store the permission of the Initiator to communicate with the member;
        a routing module comprising instructions that, when executed by the processor, cause the processor to: (i) determine that the permission of the Initiator to communicate with the member is stored by the data structure in response to an attempt by the Initiator to communicate with the member, (ii) after determining that the permission of the Initiator to communicate with the member is stored by the data structure, using protected contact information of the Initiator as a verification of authenticity of the Initiator, wherein the protected contact information of the Initiator is stored by the data structure, and (iii) route a communication from the Initiator to the member using the protected contact information specific to the member stored by the data structure, without revealing the protected contact information to the Initiator; and
        an update module comprising instructions that, when executed by the processor, cause the processor to modify the data structure in response to receiving an update request from the member to change at least a portion of the protected contact information of the member, wherein the portion of the protected contact information that is updated comprises updated protected contact information that is different from the protected contact information, wherein the routing module causes the processor to route the communication from the Initiator to the member using the updated protected contact information without requiring the permissions module to obtain a second permission of the Initiator to communicate with the member.

2. The permissions-based communication management system of claim 1, wherein the routing module causes the processor to route the communication from the Initiator to the member using the updated protected contact information stored by the data structure, instead of the protected contact information, without revealing the updated protected contact information to the Initiator.

3. The permissions-based communication management system of claim 1, wherein the approval received by the permissions module specifies a mode of communication that is acceptable to the member for communications from the Initiator, and the permissions module modifies the data structure to include the mode of communication.

4. The permissions-based communication management system of claim 3, wherein the routing module determines whether the communication from the Initiator corresponds to the mode of communication that is acceptable to the member, and:
    routes the communication from the Initiator to the member if the communication from the Initiator corresponds to the mode of communication that is acceptable to the member, and
    interferes with transmission of the communication from the Initiator to the member if the communication from the Initiator does not correspond to the mode of communication that is acceptable to the member.

5. The permissions-based communication management system of claim 1, wherein:
    the permissions module further comprises instructions that, when executed by the processor in response to receiving a second request to communicate with the member submitted by the Initiator, cause the processor to determine that the permission of the Initiator to communicate with the member is stored by the data structure; and
    the routing module causes the processor to route a second communication from the Initiator to the member using the protected contact information stored by the data structure without requiring modification of the data structure to store the permission of the Initiator to communicate with the member in response to the second request to communicate with the member.

6. The permissions-based communication management system of claim 1, wherein the routing module routes the communication from the Initiator to the member by looking up an actual email address of the member included in the protected contact information based on contact information used by the Initiator to submit the communication to be sent to the member, and sending the communication to the actual email address.

7. The permissions-based communication management system of claim 6, wherein the routing module receives a responsive communication submitted by the member to be transmitted to the Initiator, and transmits the responsive communication to an email address associated with the Initiator without conveying the actual email address of the member to the Initiator.

8. The permissions-based communication management system of claim 1, wherein the routing module routes the communication from the Initiator to the member by looking up an actual telephone number of the member included in the protected contact information based on contact information used by the Initiator to submit the communication to be sent to the member, and forwarding the communication to the actual telephone number of the member.

9. The permissions-based communication management system of claim 8, wherein the routing module obfuscates the actual telephone number of the member from the Initiator, forwarding the communication to the actual telephone number without granting the Initiator access to the actual telephone number.

10. A computer-implemented, permissions-based method of managing network communications, the method comprising:
storing, in a non-transitory memory, a data structure that is linked to a user account associated with a member, the data structure comprising protected contact information specific to the member, wherein a data store stores the data structure;
in response to receiving a request to communicate with the member submitted by an Initiator: (i) conducting a search of the data store to identify the member; (ii) transmitting an approval request over a communication network to be reviewed by the member; (iii) receiving an approval submitted by the member granting permission to the Initiator to communicate with the member; and (iv) modifying the data structure to store the permission of the Initiator to communicate with the member;
determining that the permission of the Initiator to communicate with the member is stored by the data structure in response to an attempt by the Initiator to communicate with the member;
after determining that the permission of the Initiator to communicate with the member is stored by the data structure, using protected contact information of the Initiator as a verification of authenticity of the Initiator, wherein the protected contact information of the Initiator is stored by the data structure;
after verifying the authenticity of the Initiator, routing a communication from the Initiator to the member using the protected contact information specific to the member stored by the data structure, without revealing the protected contact information to the Initiator; and
modifying the data structure in response to receiving an update request from the member to change at least a portion of the protected contact information of the member, wherein the portion of the protected contact information that is updated comprises updated protected contact information that is different from the protected contact information, wherein routing the communication from the Initiator to the member comprises using the updated protected contact information without requiring a permissions module to obtain a second permission of the Initiator to communicate with the member.

11. The computer-implemented, permissions-based method of claim 10 further comprising:
routing the communication from the Initiator to the member using the updated protected contact information stored by the data structure, instead of the protected contact information that was stored before modifying the data structure, without revealing the updated protected contact information to the Initiator.

12. The computer-implemented, permissions-based method of claim 10, wherein receiving the approval comprises determining a mode of communication that is acceptable to the member for communications from the Initiator, and modifying the data structure to include the mode of communication.

13. The computer-implemented, permissions-based method of claim 12 further comprising:
determining whether the communication from the Initiator corresponds to the mode of communication that is acceptable to the member:
routing the communication from the Initiator to the member if the communication from the Initiator corresponds to the mode of communication that is acceptable to the member; and
interfering with transmission of the communication from the Initiator to the member if the communication from the Initiator does not correspond to the mode of communication that is acceptable to the member.

14. The computer-implemented, permissions-based method of claim 10 further comprising:
in response to receiving a second request to communicate with the member submitted by the Initiator, determining that the permission of the Initiator to communicate with the member is stored by the data structure; and
routing a second communication from the Initiator to the member using the protected contact information stored by the data structure without requiring modification of the data structure to store a second permission of the Initiator to communicate with the member in response to the second request to communicate with the member.

15. The computer-implemented, permissions-based method of claim 10, wherein routing the communication from the Initiator to the member comprises:
looking up an actual email address of the member included in the protected contact information based on contact information used by the Initiator to submit the communication to be sent to the member; and
sending the communication to the actual email address.

16. The computer-implemented, permissions-based method of claim 15 further comprising:
receiving a responsive communication submitted by the member to be transmitted to the Initiator; and
transmitting the responsive communication to an email address associated with the Initiator without conveying the actual email address of the member to the Initiator.

17. The computer-implemented, permissions-based method of claim 10, wherein routing the communication from the Initiator to the member comprises:

looking up an actual telephone number of the member included in the protected contact information based on contact information used by the Initiator to submit the communication to be sent to the member; and forwarding the communication to the actual telephone number of the member.

18. A non-transitory computer-readable medium storing instructions that when executed by one or more processors cause the one or more processors to perform at least:

storing, in a non-transitory memory, a data structure that is linked to a user account associated with a member, the data structure comprising protected contact information specific to the member, wherein a data store stores the data structure;

in response to receiving a request to communicate with the member submitted by an Initiator: (i) conducting a search of the data store to identify the member; (ii) transmitting an approval request over a communication network to be reviewed by the member; (iii) receiving an approval submitted by the member granting permission to the Initiator to communicate with the member; and (iv) modifying the data structure to store the permission of the Initiator to communicate with the member;

determining that the permission of the Initiator to communicate with the member is stored by the data structure in response to an attempt by the Initiator to communicate with the member;

after determining that the permission of the Initiator to communicate with the member is stored by the data structure, using protected contact information of the Initiator as a verification of authenticity of the Initiator, wherein the protected contact information of the Initiator is stored by the data structure;

after verifying the authenticity of the Initiator, routing a communication from the Initiator to the member using the protected contact information specific to the member stored by the data structure, without revealing the protected contact information to the Initiator; and modifying the data structure in response to receiving an update request from the member to change at least a portion of the protected contact information of the member, wherein the portion of the protected contact information that is updated comprises updated protected contact information that is different from the protected contact information, wherein routing the communication from the Initiator to the member comprises using the updated protected contact information without requiring a permissions module to obtain a second permission of the Initiator to communicate with the member.

19. The computer-implemented, permissions-based method of claim 10, wherein using protected contact information of the Initiator as a verification of authenticity of the Initiator comprises:

generating a temporary telephone number and providing the temporary telephone number to the Initiator; and in response to the Initiator calling the temporary telephone number from an actual telephone number of the Initiator, verifying that the actual telephone number matches the telephone number of the Initiator stored by the data structure to verify the authenticity of the Initiator.

20. The computer-implemented, permissions-based method of claim 10, wherein using protected contact information of the Initiator as a verification of authenticity of the Initiator comprises:

generating a temporary email address and providing the temporary email address to the Initiator; and in response to the Initiator sending an email to the temporary email address from an actual email address of the Initiator, verifying that the actual email address matches the email address of the Initiator stored by the data structure to verify the authenticity of the Initiator.

* * * * *